United States Patent [19]
Yamazaki et al.

[11] Patent Number: 5,935,186
[45] Date of Patent: *Aug. 10, 1999

[54] MONITOR SYSTEM FOR HYDRAULIC PRESSURE CIRCUITS OF VEHICLES

[75] Inventors: Norio Yamazaki, Kariya; Kenji Tozu, Yokkaichi; Yoshiyuki Yasui, Kariya; Masanobu Fukami, Hazu gun; Takayuki Itoh, Nagoya, all of Japan

[73] Assignee: Aisin Seiki Kabushiki Kaisha, Kariya, Japan

[*] Notice: This patent is subject to a terminal disclaimer.

[21] Appl. No.: 08/749,224

[22] Filed: Nov. 15, 1996

[30] Foreign Application Priority Data

Nov. 17, 1995 [JP] Japan .................................. 7-323870

[51] Int. Cl.$^6$ ..................................................... B60T 13/00
[52] U.S. Cl. .............................. 701/78; 701/79; 303/9.62; 303/113.5
[58] Field of Search ................................ 701/36, 41, 69, 701/70, 71, 72, 75, 78, 79, 76, 83, 82; 303/9.62, 113.5, 116.1, 119.1, 116.2, 146, 115.2, 163, 165, 158, 173, 122.07

[56] References Cited

U.S. PATENT DOCUMENTS

| | | | |
|---|---|---|---|
| 3,988,043 | 10/1976 | Reinecke | 303/160 |
| 5,058,018 | 10/1991 | Kuwana et al. | 701/73 |
| 5,150,952 | 9/1992 | Kuwana et al. | 701/75 |
| 5,176,430 | 1/1993 | Kuwana et al. | 303/158 |
| 5,220,506 | 6/1993 | Kuwana et al. | 701/79 |
| 5,461,565 | 10/1995 | Sakane et al. | 701/78 |
| 5,547,264 | 8/1996 | Tozu et al. | 303/9.62 |
| 5,560,690 | 10/1996 | Hattori et al. | 303/116.2 |
| 5,624,164 | 4/1997 | Tozu et al. | 303/9.62 |
| 5,691,900 | 11/1997 | Luckevich | 701/41 |

FOREIGN PATENT DOCUMENTS

| 38 28 931 | 3/1990 | Germany . |
|---|---|---|
| 4-56668 | 2/1992 | Japan . |

*Primary Examiner*—Jacques H. Louis-Jacques
*Attorney, Agent, or Firm*—Burns, Doane, Swecker & Mathis, LLP

[57] ABSTRACT

The present invention is directed to a monitor system for use in an automotive vehicle which includes wheel brake cylinders operatively mounted on wheels, respectively, and which includes a hydraulic pressure control apparatus for generating a hydraulic braking pressure in response to depression of a brake pedal. A difference calculating unit calculates a difference between a wheel speed of a wheel to be determined and a wheel speed of at least one reference wheel which is compared with a predetermined value, when a braking operation detection unit detects a braking operation. Then, a determination unit compares the difference with a predetermined value, and determines that the pressure circuit provided for the wheel to be determined is normal, when the difference is lower than the predetermined value. An output unit may be provided to produce an output signal when a period of time during which the difference continues to be equal to or greater than the predetermined value, exceeds a predetermined time.

8 Claims, 5 Drawing Sheets

MONITOR SYSTEM FOR HYDRAULIC PRESSURE CIRCUITS OF VEHICLES

BACKGROUND OF THE INVENTION

1. Field of the Invention

The present invention relates to a monitor system for hydraulic pressure circuits of vehicles, and more particularly to the monitor system for monitoring a hydraulic braking pressure in each hydraulic pressure circuit including a wheel brake cylinder of an automotive vehicle which has a hydraulic pressure control apparatus for supplying the hydraulic braking pressure into the wheel brake cylinder through the hydraulic pressure circuit in response to depression of a brake pedal.

2. Description of the Related Arts

In general, a vehicle is provided with a braking system for supplying a hydraulic braking pressure into each wheel brake cylinder in accordance with the depressed amount of a brake pedal, i.e., the brake pedal stroke. However, a desired hydraulic braking pressure may not be supplied constantly, due to a vapour-lock or the like.

In a Japanese Patent Laid-open Publication No. 4-56668, for example, a brake pedal stroke compensating apparatus has been proposed to compensate a hydraulic pressure corresponding to the brake pedal stroke. The apparatus includes means for measuring the brake pedal stroke, means for detecting the hydraulic pressure in a main hydraulic passage, and a fluid supply apparatus which compares a signal output from the stroke measuring means with a signal output from the pressure detecting means to calculate an amount of fluid lacking in the main passage and supply the lacking amount of fluid into the main passage.

However, it is not easy to determine a lack of the hydraulic braking pressure supplied to each wheel brake cylinder. Therefore, generally employed is means for directly detecting the hydraulic pressure generated from a master cylinder, as proposed previously. Since a pressure sensor for detecting the hydraulic pressure is relatively expensive, it is desired to determine without using the pressure sensor at least such a condition that a proper hydraulic braking pressure is applied to each wheel brake cylinder.

According to the apparatus as described above, it is possible to determine the condition of the hydraulic braking pressure in a braking system as a whole by detecting the hydraulic pressure generated from the master cylinder. However, it is impossible to determine the condition of the hydraulic braking pressure in each hydraulic pressure circuit including a wheel brake cylinder provided for each wheel.

SUMMARY OF THE INVENTION

Accordingly, it is an object of the present invention to provide a monitor system for use in an automotive vehicle which has a hydraulic pressure control apparatus for supplying a hydraulic braking pressure into each wheel brake cylinder through a hydraulic pressure circuit in response to depression of a brake pedal, wherein the monitor system is capable of monitoring properly the hydraulic braking pressure in the hydraulic pressure circuit including each wheel brake cylinder, without using a pressure sensor.

In accomplishing the above and other objects, a monitor system is provided for monitoring hydraulic pressure circuits disposed in an automotive vehicle which has a hydraulic pressure control apparatus for generating a hydraulic braking pressure in response to depression of a brake pedal. The vehicle includes wheel brake cylinders operatively mounted on the wheels of the vehicle for braking the wheels and connected to the hydraulic pressure control apparatus through the hydraulic pressure circuits, respectively. The monitor system includes wheel speed detection means for detecting the wheel speeds of said wheels, respectively. Vehicle speed estimation means is provided for calculating an estimated vehicle speed for each wheel on the basis of the wheel speeds detected by the wheel speed detection means. Braking operation detection means is provided for detecting a braking operation in response to depression of the brake pedal. Difference calculating means is provided for calculating a difference between a wheel speed of a wheel to be determined and a wheel speed of at least one reference wheel to be compared with the wheel speed of the wheel to be determined, when the braking operation detection means detects the braking operation, and determination means may be provided for comparing the difference calculated by the difference calculating means with a predetermined value, and determining that one of the pressure circuits provided for the wheel to be determined is normal, when the difference is lower than the predetermined value. The above-described reference wheel is a wheel having a certain relationship with the wheel to be determined.

In stead of the difference calculation means and the determination means as described above, slip rate calculating means may be provided for calculating a wheel slip rate for a wheel to be determined, on the basis of a wheel speed of said wheel to be determined out of the wheel speeds detected by the wheel speed detection means and the estimated vehicle speed calculated by the vehicle speed estimation means, when the braking operation detection means detects the braking operation. And, determination means is provided for comparing the wheel slip rate calculated by the slip rate calculation means for the wheel to be determined, with a predetermined slip rate, and determining that one of said pressure circuits provided for the wheel to be determined is normal, when the wheel slip rate for the wheel to be determined exceeds the predetermined slip rate.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
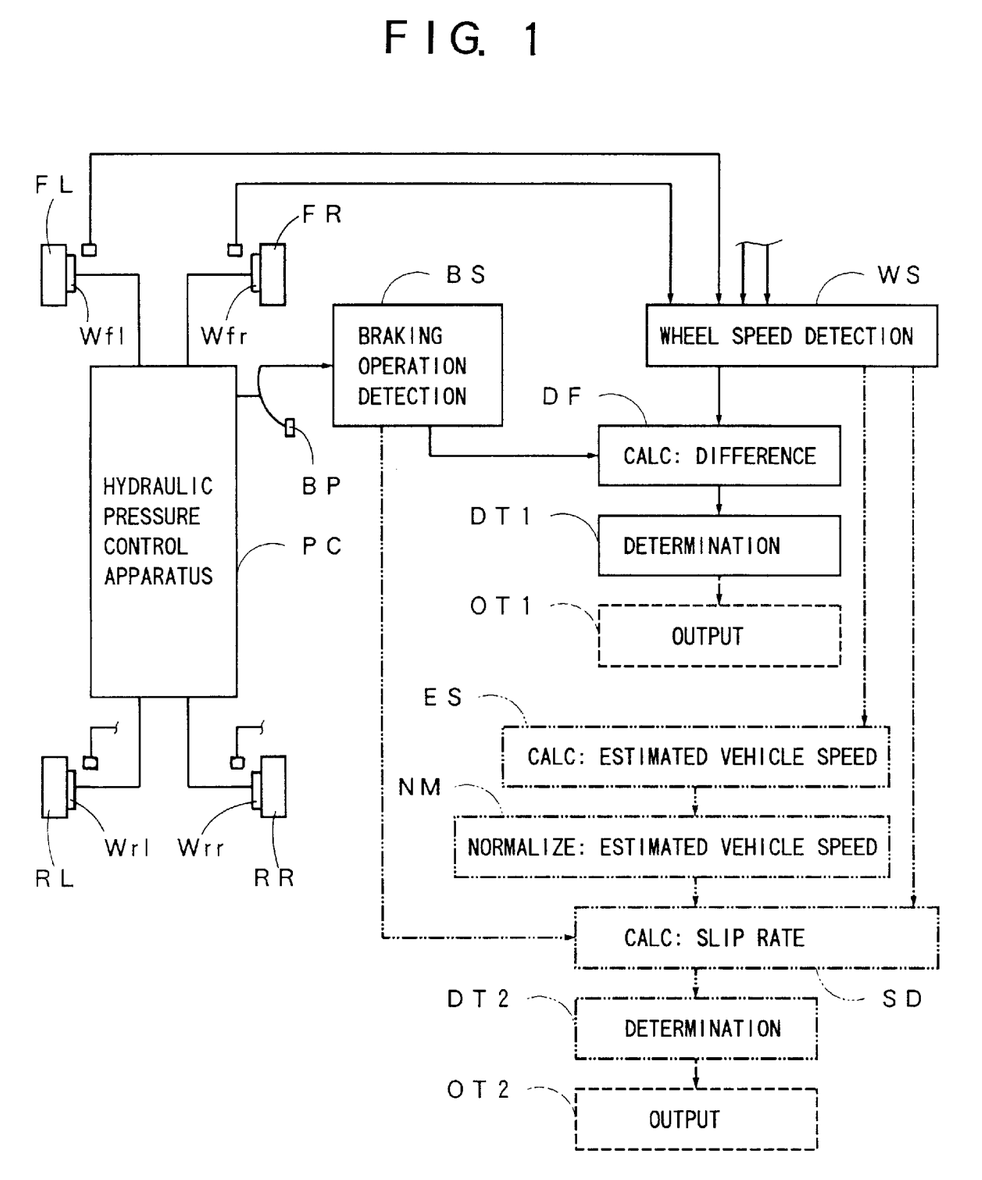
FIG. 1 is a general block diagram illustrating a monitor system for hydraulic pressure circuits of vehicles according to the present invention.

Referring to FIG. 1, there is schematically illustrated a monitor system according to the present invention, for use in an automotive vehicle which includes wheel brake cylinders Wfr, Wfl, Wrr, Wrl operatively mounted on wheels FR, FL, RR, RL, respectively, and which includes a hydraulic pressure control apparatus PC for generating a hydraulic braking pressure in response to depression of a brake pedal BP. The pressure control apparatus PC is connected to the wheel brake cylinders Wfr, Wfl, Wrr, Wrl through hydraulic pressure circuits, respectively, so as to apply the braking force to each wheel. A wheel speed detection unit WS detects wheel speeds of the wheels, respectively, and a braking operation detection unit DS detects a braking operation in response to depression of the brake pedal BP. A difference calculating unit DF is adapted to calculate a difference between a wheel speed of a wheel to be determined and a wheel speed of at least one reference wheel which is compared with the wheel speed of the wheel to be determined, when the braking operation detection unit BS detects the braking operation. The reference wheel is a wheel which has a certain relationship with the wheel to be determined, e.g., a relationship between the front right wheel FR and the front left wheel FL, a relationship between the rear right wheel RR and the rear left wheel RL, a relationship between the front wheel FR (or, FL) and the rear wheel RR (or, RL), and a relationship between one wheel and the rest of the wheels. Furthermore, a determination unit DT1 is provided for comparing the difference calculated by the difference calculating unit DF with a predetermined value. The determination unit DT1 is adapted to determine that the pressure circuit provided for the wheel to be determined is normal, when the difference is lower than the predetermined value. Then, an output unit OT1 produces an output signal when a period of time during which the difference between the wheel speed of the wheel to be determined and the wheel speed of the reference wheel continues to be equal to or greater than the predetermined value, exceeds a predetermined time.

As illustrated by broken lines in FIG. 1, a slip rate calculation unit SD, a determination unit DT2, and an output unit OT2 may be provided, in lieu of the difference calculating unit DF, the determination unit DT1, and the output unit OT1 as described above. That is, the slip rate calculation unit SD is adapted to calculate a wheel slip rate for a wheel to be determined of the wheels, on the basis of the wheel speed of the wheel to be determined and the estimated vehicle speed, when the braking operation detection unit BS detects the braking operation. And, the determination unit DT2 is adapted to compare the wheel slip rate for the wheel to be determined with a predetermined slip rate, and determine that one of the pressure circuits provided for the wheel to be determined is normal, when the wheel slip rate for the wheel to be determined exceeds the predetermined slip rate. Then, the output unit OT2 produces an output signal when a period of time during which the wheel slip rate for the wheel to be determined continues to be equal to or lower than the predetermined slip rate, exceeds a predetermined time. In this monitor system, a normalizing unit NM may be provided for normalizing the estimated vehicle speed for each wheel calculated by the vehicle speed estimation unit ES in accordance with a condition of each wheel to provide a normalized vehicle speed. In this case, the slip rate calculation unit SD is adapted to calculate the wheel slip rate for the wheel to be determined, on the basis of the wheel speed of the wheel to be determined and the normalized vehicle speed, when the braking operation detection unit BS detects the braking operation.

Figure 2:
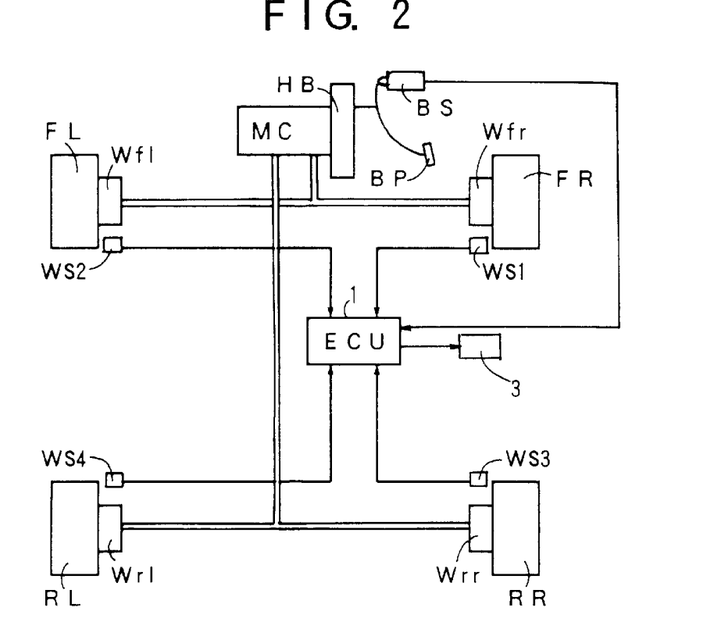
FIG. 2 is a schematic block diagram of a vehicle braking system for use in one embodiment of the present invention.

More specifically, the details of the embodiment disclosed in FIG. 1 are illustrated in FIGS. 2 to 6. As shown in FIG. 2, a braking system according to the present embodiment includes the wheel brake cylinders Wfr, Wfl, Wrr, Wrl which are operatively mounted on the wheels FR, FL, RR, RL, and which are fluidly connected to a master cylinder MC respectively. According to the present embodiment, the hydraulic pressure control apparatus includes the master cylinder MC and a hydraulic booster HB which are activated to apply the hydraulic braking pressure to each wheel brake cylinder in response to depression of the brake pedal BP. In lieu of the hydraulic booster HB, a vacuum booster (not shown) may be employed. In addition, an auxiliary pressure source (not shown) may be provided. The wheel FR designates the wheel at the front right side as viewed from the position of a driver's seat, the wheel FL designates the wheel at the front left side, the wheel RR designates the wheel at the rear right side, and the wheel RL designates the wheel at the rear left side. According to the present embodiment, a front-rear dual circuit system, which is divided into the front hydraulic circuits and the rear hydraulic circuits, is employed, while a diagonal circuit system may be employed.

At the road wheels FR, FL, RR and RL, there are provided wheel speed sensors WS1 to WS4 respectively, which are connected to an electronic controller (ECU) 1, and by which a signal having pulses proportional to a rotational speed of each wheel, i.e., a wheel speed signal is fed to the electronic control unit 1. Also, connected to the electronic control unit 1 is a brake switch BS which serves as the braking operation detection means, and which turns on when the brake pedal BP is depressed, and turns off when the brake pedal BP is released. An annunciator 3 is connected to an output port of the the electronic control unit 1. According to the present embodiment, a lamp (not shown) is employed for the annunciator 3, while a liquid crystal display (not shown) a buzzer (not shown) or the like may be employed.

The electronic control unit 1 is provided with a microcomputer having a central processing unit or CPU, a read-only memory or ROM, a random access memory or RAM, an input port, an output port and etc., which are previously known. The signals detected by the wheel speed sensors WS1 to WS4, brake switch BS and etc. are fed through the input port to the CPU. Then, a signal is output from the output port and fed to the annunciator 3. In the microcomputer, the ROM memorizes a program for providing various processes including the one corresponding to a flowchart as shown in FIG. 4, the CPU executes the program while an ignition switch (not shown) is closed, and the RAM temporarily memorizes variable data needed to execute the program.

Figure 4:
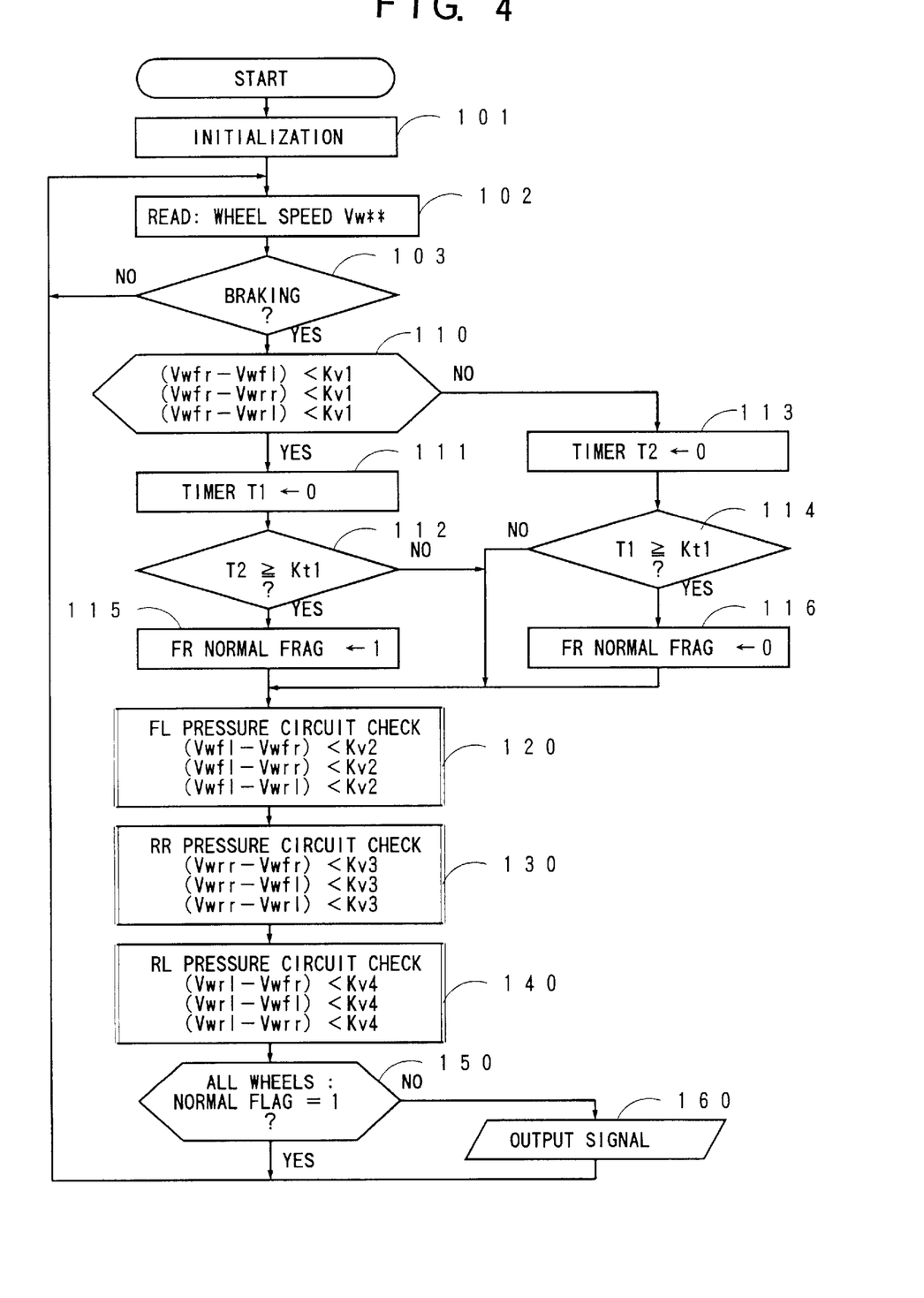
FIG. 4 is a flowchart showing a monitoring process according to the one embodiment of the present invention.

FIG. 4 shows an example of a pressure circuit monitoring process executed in the braking system as shown in FIG. 2. At the outset, the program provides for initialization of the system at Step 101 to clear various data. At Step 102, the signals detected by the wheel speed sensors WS1 to WS4 are read to provide the wheel speed Vw ( represents one of the wheels FR, FL, RR, RL). Then, the program proceeds to Step 103 where it is determined on the basis of the output from the brake switch BS whether the braking maneuver has been made or not. If it is determined that the braking maneuver has been made, the program proceeds to Step 110 and further to Steps following Step 110. The process executed at Steps 110 to 116 relates to the one for checking a hydraulic pressure circuit (hereinafter, simply referred to as pressure circuit) including the wheel brake cylinder Wfr provided for the front wheel FR, and the similar processes are executed at Steps 120 to 140 for checking pressure circuits including the wheel brake cylinder Wfl, Wrr, Wrl provided for the front wheel FL, the rear wheel RR and the rear wheel RL, respectively.

At Step 110, differences between the wheel speed Vwfr of the front right wheel FR, which is to be determined, and the wheel speeds Vwfl, Vwrr, Vwrl of other wheels FL, RR, RL are calculated respectively, and those differences (+ or –) are compared with a predetermined value Kv1, respectively. If it is determined that all of three differences are lower than the predetermined value Kv1, the program proceeds to Step 111 where a timer T1 is cleared to be zero (0), and then proceeds to Step 112 where it is determined whether a timer T2 has exceeded a predetermined time Kt1 (e.g., 0.1 sec). If the result is affirmative, it is determined that the pressure circuit for the wheel FR is normal, so that a FR normal flag is set (1) at Step 115. On the other hand, if it is determined that any one of three differences is equal to or greater than the predetermined value Kv1, the program proceeds to Step 113 where the timer T2 is cleared to be zero (0), and then proceeds to Step 114 where it is determined whether the timer T1 has exceeded the predetermined time Kt1. If the result is affirmative, it is determined that the pressure circuit for the wheel FR is not normal, so that the FR normal flag is reset to be zero (0) at Step 116. Therefore, in the case where it is determined at Steps 112, 114 that both of the timers T1 and T2 do not exceed the predetermined time Kt1, the condition of the previous FR normal flag is maintained. As a result, a hysteresis is provided in this determination.

Supposing that the wheel FR is to be determined and that the wheels FL, RR, RL are the reference wheels, it is possible to determine whether the pressure circuit of the wheel FR is normal or not, by comparing the wheel speed Vwfr of the wheel FR with the wheel speeds Vwfl, Vwrr, Vwrl of the wheels FL, RR, RL, or by comparing each of the wheel speed differences (Vwfr - Vwfl), (Vwfr - Vwrr), (Vwfr - Vwrl) with the predetermined value Kv1, in magnitude, respectively. Consequently, it is possible to check the pressure circuit provided for the wheel FR, i.e., it is possible to determine if all of the parts, which are disposed in the pressure circuit provided for the wheel FR, such as a brake pad, a caliper, a rotor and a modulator (if provided), operate properly. Supposing that the wheel FL is to be determined and that the wheels FR, RR, RL are the reference wheels, it is possible to check the pressure circuit provided for the wheel FL in the same manner as described above. With respect to the pressure circuits for the rear wheels RR, RL, they are checked in the same manner as described above. Accordingly, at Step 120, the pressure circuit provided for the wheel FL is checked by comparing each of the wheel speed differences (Vwfl - Vwfr), (Vwfl - Vwrr), (Vwfl - Vwrl) with a predetermined value Kv2, in magnitude, respectively. Furthermore, with respect to the rear wheels RR, RL, three differences are compared with the predetermined values Kv3, Kv4 in magnitude, respectively at Steps 130, 140, so that the pressure circuits provided for the wheels RR, RL are checked properly.

After the checks have been made with respect to all of the pressure circuits, the program proceeds to Step 150 where the condition of the normal flag of each wheel is determined. If all of the normal flags have been set, the program returns to Step 102. However, if any one of the normal flags has not been set, the program proceeds to Step 160 where a signal is output to the annunciator 3 to flash the lamp (not shown). As for the annunciator 3, if a plurality of lamps corresponding to all of the pressure circuits are provided, respectively, it is possible to flash only the lamp corresponding to the pressure circuit for which the normal flag has not been set, so that it is possible to identify the pressure circuit which is not in the normal condition.

According to the present embodiment as described above, once the brake pedal is depressed, it can be determined automatically whether the hydraulic braking pressure is properly applied to the pressure circuit for each wheel. Therefore, in such a vehicle that includes an apparatus for performing a steering control by braking which applies a braking force to each wheel irrespective of depression of the brake pedal so as to maintain vehicle stability, or that includes an anti-skid control apparatus for controlling the braking force to each wheel so as to prevent the wheel from being locked during braking, it is possible to easily provide the pressure circuit monitoring function without employing another sensor or the like. According to the present embodiment, it is so constituted that such a condition that the difference of the wheel speeds exceeds the predetermined value Kv1 continues longer than the predetermined time Kt1, then the normal flag will be reset to be zero. Therefore, the pressure circuit can be monitored properly, without causing any error in determination due to disturbance caused by a rough road or the like.

Figure 3:
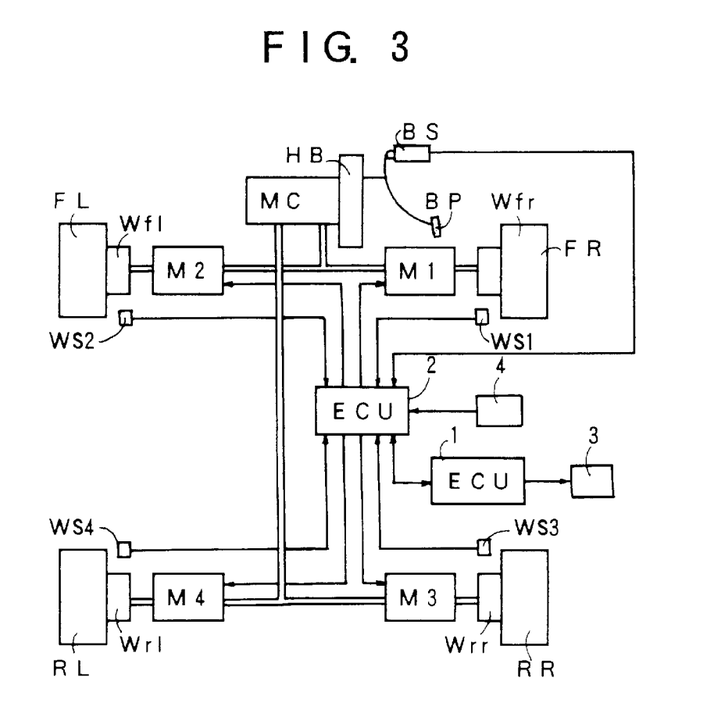
FIG. 3 is a schematic block diagram of a vehicle braking system for use in another embodiment of the present invention.

FIG. 3 shows another embodiment of the braking system, which is provided for a vehicle having an electronic control unit 2 and a vehicle condition monitor 4, and in which the electronic control unit 1 as shown in FIG. 2 is arranged to be electrically connected to the electronic control unit 2 and communicated with each other through a serial communication or the like. In this system, modulators M1 to M4 are disposed in the pressure circuits, respectively, so that the pressure circuits including these modulators M1–M4 are monitored. Each modulator is provided with a plurality of solenoid valves and formed in a manner as previously known. The vehicle condition monitor 4 includes a steering angle sensor (not shown), longitudinal and lateral acceleration sensors (not shown), yaw rate sensor (not shown) or the like. Based on the outputs of these sensors and the outputs of the wheel speed sensors WS1 to WS4 as described before, the electronic control unit 2 is adapted to perform various controls such as the steering control by braking, a front-rear braking force distribution control, a traction control or the like. Therefore, it is easy to provide the pressure circuit monitoring function performed by the electronic control unit 1, in addition to the previously known controls. In this respect, the electronic control unit 1 can receive from the electronic control unit 2 various signals for use in providing the condition for the controls such as the anti-skid control, so that it is not necessary to connect the electronic control unit 1 with the wheel speed sensors WS1 to WS4 or the like, individually. The input signals to be fed into the electronic control unit 1 are wheel speed signals, vehicle condition signals as described before, the normalized vehicle speed, and a checking condition signal which will be described later. The condition (1 or 0) of the normal flag indicative of the checking result of each pressure circuit is output from the the electronic control unit 1 to the electronic control unit 2. These electronic control units 1 and 2 may be formed in one body to make use of the microcomputer commonly.

Figure 5:
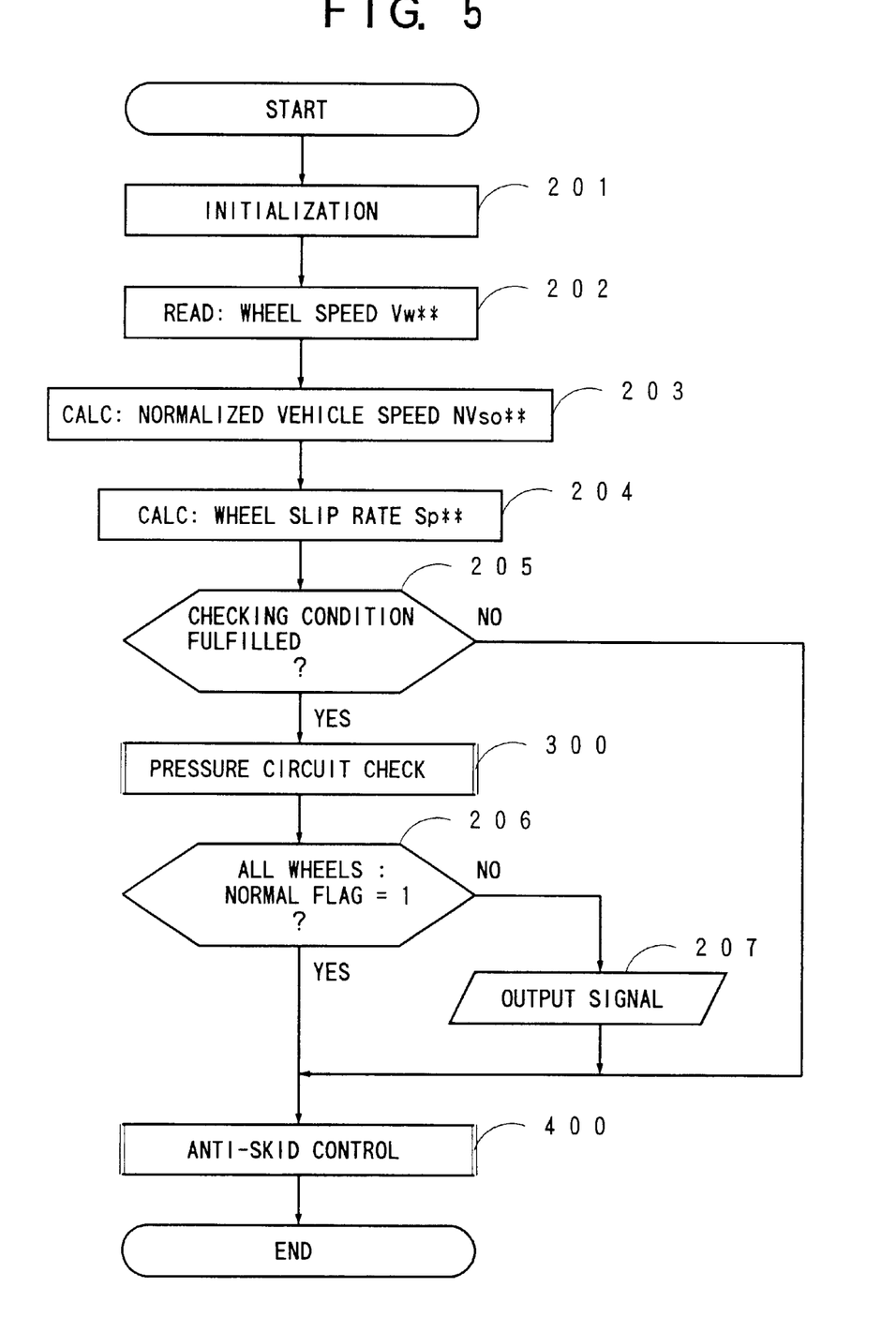
FIG. 5 is a flowchart showing a monitoring process executed prior to an anti-skid control, according to another embodiment of the present invention.

FIG. 5 shows a pressure monitoring process executed prior to the anti-skid control in the braking system as shown in FIG. 3. At the outset, the system is initialized at Step 201 to clear various data, and flags which will be described later are reset to be zero. Next, at Step 202, the signals detected by the wheel speed sensors WS1 to WS4 are fed into the microcomputer to provide the wheel speed Vw. Further, a wheel acceleration DVw may be calculated on the basis of the wheel speed, if necessary. Then, the program proceeds to Step 203 where an estimated vehicle speed Vso on the center of gravity of the vehicle is calculated in accordance with the equation of Vso=MAX[Vw], for example. According to the present embodiment, on the basis of the estimated vehicle speed Vso, an estimated vehicle speed Vso is calculated on each wheel in accordance with a geometrical arrangement of the wheels. Then, the estimated vehicle speed Vso is normalized to reduce the error caused by a difference between two wheels located on the inside and outside of the curve during cornering. That is, a normalized vehicle speed NVso is calculated in accordance with the following equation:

$$NVso^{}=Vso^{}(n)-\Delta Vr^{**}(n)$$

where $\Delta Vr^{}(n)$ is a correction factor provided for correction during cornering as follows: That is, the correction factor $\Delta Vr^{}(n)$ is set on the basis of a turning radius R and $\gamma \cdot VsoFW$ (FW represents the front wheels) which is nearly equal to the lateral acceleration Gya, according to a map (not shown) provided for each wheel except for a reference wheel. If $\Delta$ VrFL is employed as a reference value for example, it is set to be zero. Then, $\Delta$ VrFR is set according to a map (not shown) provided for the difference between two wheels located on the inside and outside of the curve during cornering. With respect to the rear wheels, $\Delta$ VrRL is set according to a map (not shown) provided for the difference between two wheels both located on the inside of the curve during cornering, while $\Delta$ VrRR is set according to a map (not shown) provided for the difference between two wheels both located on the outside of the curve during cornering, and also according to the map provided for the difference between two wheels located on the inside and outside of the curve during cornering.

Then, at Step 204, a slip rate Sp for each wheel is calculated on the basis of the wheel speed Vw for each wheel and the normalized vehicle speed NVso** which are calculated at Steps 202 and 203, respectively, in accordance with the following equation:

$$Sp^{}=(NVso^{}-Vw^{})/ NVso^{}$$

The program further proceeds to Step 205 where it is determined whether the condition for allowing the pressure circuit check to be made or not. If the condition has not been fulfilled, the program proceeds to Step 400. In the case where it is determined at Step 205 that the braking maneuver has not been made, or the anti-skid control is being made, or a deceleration during braking is relatively small, then the pressure circuit check will not be allowed. In other words, the program proceeds to Step 300 where the pressure circuit check will be made, only when the pressure circuit check has not been completed, the anti-skid control or the like has not started (i.e., under non-control), and the deceleration is caused by braking to exceed a predetermined value, e.g., 0.3 G.

After the normal flag has been set as a result of the pressure circuit check, the program proceeds to Step 400 where the anti-skid control will be performed. However, if it is determined that any one of the normal flags for the four wheels has not been set, the program proceeds to Step 207 where a signal is output to the annunciator 3 and then proceeds to Step 400. According to the annunciator 3, the lamp (not shown) corresponding to each wheel will be flashed, for example. Therefore, the pressure circuit for which the normal flag has not been set will be identified.

Figure 6:
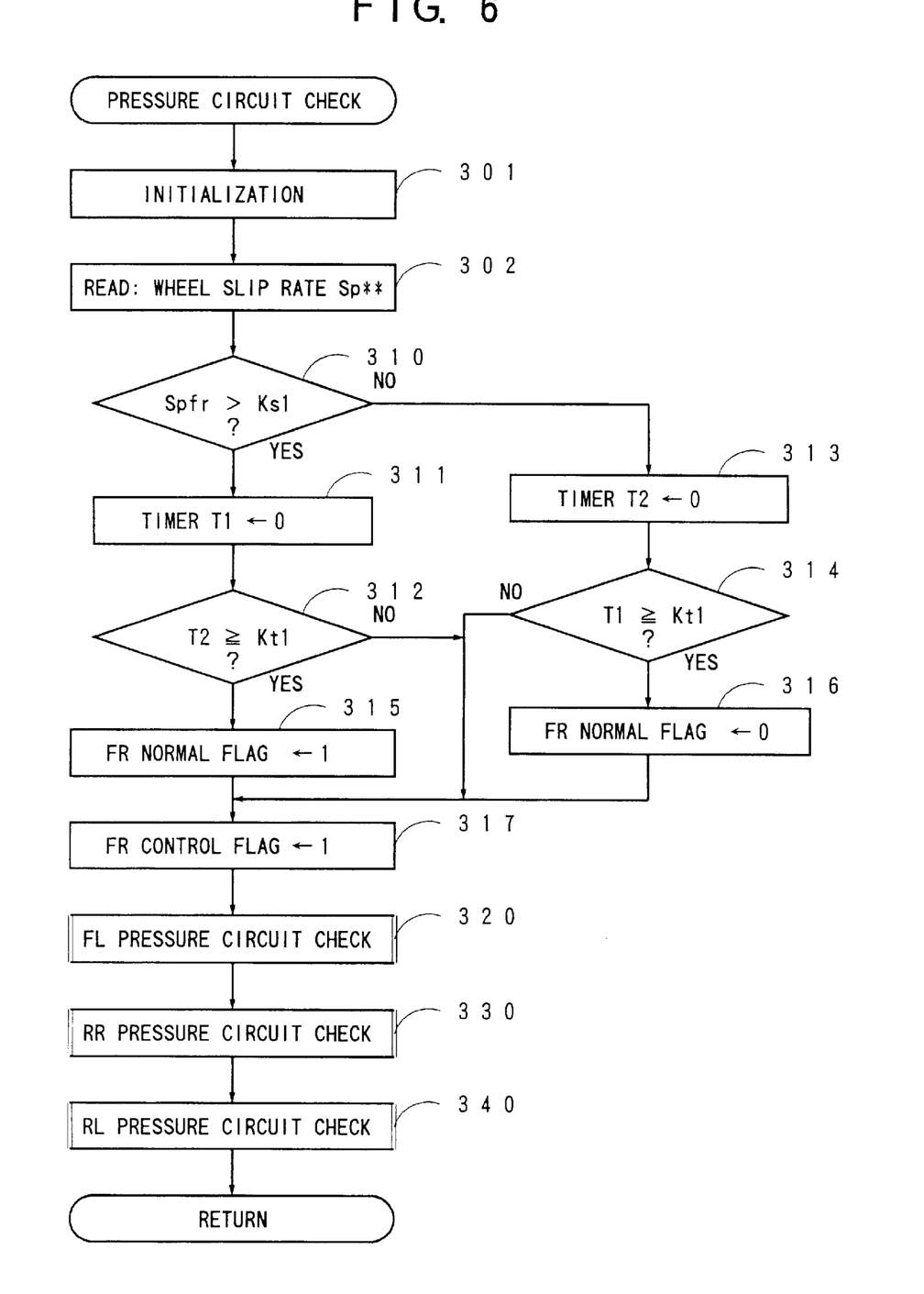
FIG. 6 is a flowchart showing a pressure circuit check according to another embodiment of the present invention.

FIG. 6 shows an example of the pressure circuit check which is made at Step 300 in FIG. 5, wherein the initialization is made at Step 301 and then the wheel slip rate Sp** is input at Step 302. If it is determined at Step 310 that the wheel slip rate Spfr of the wheel FR exceeds a predetermined slip rate Ks1, the program proceeds to Step 311 where the timer T1 is cleared to be zero (0), and then proceeds to Step 312 where it is determined whether the timer T2 has exceeded the predetermined time Kt1 (e.g., 0.1 sec). If the result is affirmative, it is determined that the pressure circuit for the wheel FR is normal, so that the FR normal flag is set (1) at Step 315. On the other hand, if it is determined at Step 310 that the wheel slip rate Spfr of the wheel FR is equal to or lower than the predetermined slip rate Ks1, the program proceeds to Step 313 where the timer T2 is cleared to be zero (0), and then proceeds to Step 314 where it is determined whether the timer T1 has exceeded the predetermined time Kt1. If the result is affirmative, it is determined that the pressure circuit for the wheel FR is not normal, so that the FR normal flag is reset to be zero (0) at Step 316. Therefore, in the case where it is determined at Steps 312, 314 that both of the timers T1 and T2 do not exceed the predetermined time Kt1, the condition of the previous FR normal flag is maintained. As a result, the hysteresis is provided in this determination, as well.

Then, the program proceeds to Step 317, where a FR control flag is set to indicate the completion of the pressure circuit check with respect to the pressure circuit for the wheel FR, and then proceeds to Step 320 where the pressure circuit is checked with respect to the pressure circuit for the wheel FL, in the same manner as Steps 310 to 317. Furthermore, the pressure circuits are checked with respect to the pressure circuits for the wheels RR, RL at Steps 330, 340 in the same manner as described above, and then the program returns to Step 206 as shown in FIG. 5. The FR normal flag and the FR control flag set at Steps 315 and 317 are used in the anti-skid control which is performed at Step 400 in FIG. 5, wherein the anti-skid control is performed only when both of the flags are set with respect to the wheel to be controlled. In other words, the anti-skid control is not performed with respect to the wheel for which both of the normal flag and the control flag are not set.

With respect to the pressure circuit check to be performed at Step 300 in FIG. 5, the pressure circuit check performed in the pressure circuit monitoring process as shown in FIG. 4 may be substituted for the pressure circuit check in FIG. 6.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A monitor system for monitoring hydraulic pressure circuits disposed in an automotive vehicle having a hydraulic pressure control apparatus for generating a hydraulic braking pressure in response to depression of a brake pedal, and wheel brake cylinders operatively mounted on wheels of said vehicle for braking said wheels and connected to said hydraulic pressure control apparatus through said hydraulic pressure circuits, respectively, comprising:

wheel speed detection means for detecting wheel speeds of said wheels, respectively;

braking operation detection means for detecting a braking operation in response to depression of said brake pedal;

difference calculating means for calculating a difference between a wheel speed of a wheel to be determined and a wheel speed of at least one reference wheel to be compared with the wheel speed of said wheel to be determined, when said braking operation detection means detects the braking operation, said reference wheel having a certain relationship with said wheel to be determined; and determination means for comparing the difference calculated by said difference calculating means with a predetermined value, and determining that one of said pressure circuits provided for said wheel to be determined is normal, when the difference calculated by said difference calculating means is lower than the predetermined value.

2. The monitor system as claimed in claim 1, wherein said difference calculating means calculates the differences between the wheel speed of said wheel to be determined and the wheel speeds of the rest of said wheels, when said braking operation detection means detects the braking operation, and wherein said determination means compares the differences calculated by said difference calculating means with the predetermined value, respectively, and determines that one of said pressure circuits provided for said wheel to be determined is normal, when all of the differences are lower than the predetermined value.

3. The monitor system as claimed in claim 1, further comprising:

output means for producing an output signal when a period of time during which the difference between the wheel speed of said wheel to be determined and the wheel speed of said reference wheel continues to be equal to or greater than the predetermined value, exceeds a predetermined time.

4. The monitor system as claimed in claim 1, wherein said hydraulic pressure control apparatus includes a master cylinder for generating the hydraulic braking pressure in response to depression of said brake pedal, and modulators disposed in said hydraulic pressure circuits, respectively, for controlling the hydraulic braking pressure therein in accordance with the condition of each wheel of said vehicle.

5. A monitor system for monitoring hydraulic pressure circuits disposed in an automotive vehicle having a hydraulic pressure control apparatus for generating a hydraulic braking pressure in response to depression of a brake pedal, and wheel brake cylinders operatively mounted on wheels of said vehicle for braking said wheels and connected to said hydraulic pressure control apparatus through said hydraulic pressure circuits, respectively, comprising:

wheel speed detection means for detecting wheel speeds of said wheels, respectively;

vehicle speed estimation means for calculating an estimated vehicle speed for each wheel on the basis of the wheel speeds detected by said wheel speed detection means;

braking operation detection means for detecting a braking operation in response to depression of said brake pedal;

slip rate calculation means for calculating a wheel slip rate for a wheel to be determined, on the basis of a wheel speed of said wheel to be determined out of the wheel speeds detected by said wheel speed detection means and the estimated vehicle speed calculated by said vehicle speed estimation means, when said braking operation detection means detects the braking operation; and determination means for comparing the wheel slip rate calculated by said slip rate calculation means for said wheel to be determined, with a predetermined slip rate, and determining that one of said pressure circuits provided for said wheel to be determined is normal, when the wheel slip rate calculated by said slip rate calculation means for said wheel to be determined exceeds the predetermined slip rate.

6. The monitor system as claimed in claim 5, further comprising:

normalizing means for normalizing said estimated vehicle speed for each wheel calculated by said vehicle speed estimation means in accordance with a condition of each wheel to provide a normalized vehicle speed, wherein said slip rate calculation means calculates the wheel slip rate for a wheel to be determined on the basis of the wheel speed of said wheel to be determined and the normalized vehicle speed, when said braking operation detection means detects the braking operation.

7. The monitor system as claimed in claim 6, further comprising:

output means for producing an output signal when a period of time during which the wheel slip rate for said wheel to be determined continues to be equal to or lower than the predetermined slip rate, exceeds a predetermined time.

8. The monitor system as claimed in claim 5, wherein said hydraulic pressure control apparatus includes a master cylinder for generating the hydraulic braking pressure in response to depression of said brake pedal, and modulators disposed in said hydraulic pressure circuits, respectively, for controlling the hydraulic braking pressure therein in accordance with the condition of each wheel of said vehicle.

* * * * *